United States Patent [19]
Melvin

[11] Patent Number: 6,041,065
[45] Date of Patent: Mar. 21, 2000

[54] FLEXIBLE MULTI-FREQUENCY REPEATER

[75] Inventor: Bruce W. Melvin, Roseville, Calif.

[73] Assignee: Hewlett-Packard Company, Palo Alto, Calif.

[21] Appl. No.: 08/910,652

[22] Filed: Aug. 13, 1997

[51] Int. Cl.[7] .............................. A61K 9/20; A61K 9/22; A61K 9/16

[52] U.S. Cl. ........................ 370/492; 370/465; 370/468

[58] Field of Search .................... 370/438, 447, 370/449, 462, 465, 466, 401, 437, 439, 445, 459, 468, 492

[56] References Cited

U.S. PATENT DOCUMENTS

| | | |
|---|---|---|
| 5,008,879 | 4/1991 | Fischer et al. . |
| 5,077,732 | 12/1991 | Fischer et al. . |
| 5,596,575 | 1/1997 | Yang et al. ............................. 370/468 |
| 5,754,552 | 5/1998 | Allmond et al. ........................ 370/465 |

OTHER PUBLICATIONS

3Com: *Product Guide, SuperStack II Dial Speed Hub,* 3Com Corporation, May 24, 1997; http://www.3com.com/0files/products/dsheets/400307.html.

SMC: *TigerStack 100,* Standard Microsystems Corporation, Jun. 24, 1997, http://www.smc.com/network/hubs/tst100ds.html.

Compaq: Networking Products: *Netelligent Hubs,* Compaq, Jul. 1, 1997, http://www.compaq.com/products/networking/hubs/1224.html.

*Intel Express Stackable Hub,* Intel Corporation, 1997, http://www.intel.com/network/hub/index/htm.

*Primary Examiner*—Chi H. Pham
*Assistant Examiner*—Brenda H. Pham

[57] ABSTRACT

A multi-segment repeater includes a first inter-repeater bus and a second inter-repeater bus. A first repeater circuit is connected to the first inter-repeater bus and to the second inter-repeater bus. The first repeater circuit includes a 10 megabit repeater core, and one or more 100 megabit repeater cores. A selector selects which of the repeater cores is to be connected to the first inter-repeater bus. Additionally, provision is made to allow a 100 megabit repeater core to be connected to the second inter-repeater bus.

17 Claims, 3 Drawing Sheets

FLEXIBLE MULTI-FREQUENCY REPEATER

BACKGROUND

The present invention concerns networking computing devices and pertains particularly to a flexible multi-frequency repeater.

For proper operation of a Carrier Sense Multiple Access with Collision Detection (CSMA/CD) network it is necessary to limit the round-trip propagation delay of data between any two end nodes across the network. The goal is to insure that the largest packet fragment, as a result of a collision, seen on a collision domain is less than a minimum size packet. This is accomplished by fulfilling the requirements of Sections 4.2.3.2.3 and 4.4.2.1 of the ANSI/IEEE 802.3 standard and limiting the number of repeaters between any two data terminal equipment (DTE), such as an end station, a bridge, a router or a switch.

Essentially the ANSI/IEEE 802.3 standard allows for a round-trip propagation time of no more than 572 bit times. A bit time is equal to 100 nanoseconds for a 10 megabit network. The propagation of data across a network segment is measured in bit times. Various delay sources subtract from the overall delay budget. For example, media lengths, such as cable segments, introduce propagation delay. Repeaters introduce delay for start-up and steady state operation and interpacket gap shrinkage. Media Attachment Units (MAUs) introduce delay for start-up and steady state operation, and collision detect and de-assertion. There is also delay resulting from the end node response. For each of the these sources of delay, the ANSI/IEEE 802.3 standard specifies an allowable maximum delay.

Repeaters that conform to the ANSI/IEEE 802.3 and 802.3u Ethernet Carrier Sense Multiple Access with Collision Detection (CSMA/CD) standard are transparent to the nodes attached to them. These repeaters provide such basic functions as signal amplification, signal symmetry, signal timing, jitter reduction, preamble regeneration, collision handling, collision jam generation and electrical isolation.

Repeaters are commonly cascaded in a tree arrangement such that there is one upper repeater with a number of secondary repeaters below it. Below the secondary repeaters can exist additional levels of repeaters. For each level of repeater, two additional repeater delays are added between the nodes which may exist at the lowest level of the tree. Repeaters generally have a fixed number of ports. The limited number of ports combined with the maximum round trip delay requirement limits the number of end nodes that can exist in a given collision domain. This number can be increased by interconnecting repeaters via an inter-repeater bus (also called an inter-repeater backplane). The inter-repeater bus can be generally brought out external to each repeater to interconnect several repeaters. When repeaters are interconnected in this manner, they represent a network delay equivalent to a single repeater. Hence, fixed port count repeaters can be interconnected to increase the system port count, without increasing network delays between any two end nodes. Such a method of interconnection is generally referred to as "data stacking".

The inter-repeater bus (IRB) typically utilizes a signal set to interconnect repeaters in such a manner that one or more repeaters act as one large repeater. The signal set generally consists of data, control and clocking signals.

With increased port count comes increased bandwidth requirements. A method to increase the available bandwidth within data stacks is to employ multiple segments. A segment represents a collision domain. All nodes within a given segment compete for the bandwidth of that segment. With multi-segment repeaters, groups of ports can be assigned to different segments, thus dividing the bandwidth demand among the available segments.

Within multiple-segment repeaters, each segment is implemented using a separate inter-repeater bus. Data stacking and multi-segments are combined when multiple inter-repeater buses are used to interconnect repeaters. Any one port, or groups of ports, or all ports of a given repeater can be assigned and connected to any one inter-repeater bus from the available pool of inter-repeater buses. All the ports of a single segment repeater are said to be on the same segment. All devices attached to the ports of a single segment repeater share the finite bandwidth of that segment.

Repeater products are generally designed using repeater integrated circuits. Repeater integrated circuits generally provide all the functions necessary to provide basic repeater functionality as defined in Section 9 of the ANSI/IEEE Std. 802.3. Repeater integrated circuits provide a fixed limited number of repeater ports. In order to provide for larger port counts, repeater integrated circuit are interconnected using an inter-repeater bus, as discussed above. Also as discussed above, the inter-repeater bus typically utilizes a signal set to interconnect integrated circuit repeaters in such a manner that one or more integrated circuit repeaters act as one large repeater. The signal set generally consists of data, control and clocking signals.

The inter-repeater bus concept is widely used among 10 megabit 802.3 repeaters. This concept has been further extended to include multiple inter-repeater buses in a given product and/or in a data stack of several such products. With the shared nature of an 802.3 CSMA/CD network, as the number of ports increase on any given network segment, the available bandwidth to any given port effectively decreases. Separate inter-repeater buses can be used to create additional network segments. The bandwidth demand is then divided among the number of network segments. In order to implement multiple segments in this manner, several separate inter-repeater buses need to be implemented within a given repeater. For example, a product which supports up to four segments would require four internal inter-repeater buses. To support data stacking, the four internal inter-repeater buses also need to be brought external to the product.

An inter-repeater bus allows multiple repeater circuits to function as one logical repeater. Essentially there are three signal types associated with an inter-repeater bus: data, clocking and control. Actual network traffic is carried on the data signals. For 10 megabit operation a single data signal can be used when the data is transferred across the inter-repeater bus at 10 MHz.

Clocking signals are used to synchronously transfer data between devices attached to the inter-repeater bus. Control signals typically fall into two categories; collision and data. The data control signals control the path and flow of data between devices on local and stacked inter-repeater buses. The collision control signals are exchanged between devices on the local and stacked inter-repeater buses to signal when collisions occur on a given port, groups of ports, or on ports on different repeaters within a stack.

As discussed above, in order to minimize the delay through a repeater, the inter-repeater bus is generally implemented as a shared set of data signals. Each repeater integrated circuit attaches directly to the shared inter-repeater bus. Once the individual repeater integrated circuits are interconnected in this fashion they act as one large repeater with the same properties and functions as any one individual integrated circuit. All the ports of a repeater with one common inter-repeater bus are said to be on the same network segment. The inter-repeater bus can also be brought external to a repeater product such that several repeater products can be interconnected to form one large data stack, as discussed above.

With the emergence of 100 megabit CSMA/CD (802.3U) repeaters, a similar inter-repeater bus concept has also been applied. Hence, 100 megabit repeater integrated circuits can be interconnected via a 100 megabit version of the inter-repeater bus. For 100BaseT inter-repeater bus operation the number of data signals present is typically four, when 5 bit-to-4 bit decoding has occurred, otherwise 5 data signals exist.

It is also possible to integrate 10 megabit and 100 megabit repeater functions within the same repeater. This is done, for example, utilizing two inter-repeater buses: one 10 megabit inter-repeater bus and one 100 megabit inter-repeater bus. The speed of a given port is determined and that port is electrically interconnected to the appropriate inter-repeater bus, either the 10 megabit inter-repeater bus or the 100 megabit inter-repeater bus. The concept of multi-segments and multiple inter-repeater buses has similarly been extended to 100 megabit repeaters and repeater integrated circuits When using combined 10 megabit and 100 megabit repeaters, typically users start with environments of 10 megabit and 100 megabit equipment which are interconnected via the repeater. However, it is anticipated that as all older 10 megabit network devices are upgraded with newer, high-speed 100 megabit devices there will come a point at which no ports of a 10/100 megabit repeater will use the 10 megabit capabilities of the repeater. Thus it is possible that all ports will reside on the 100 megabit inter-repeater bus. Hence, the 10 megabit inter-repeater bus will be unused and idle. This wastes the capacity and bandwidth of an inter-repeater bus.

SUMMARY OF THE INVENTION

In accordance with the preferred embodiment of the present invention, a multi-segment repeater is set out. The multi-segment repeater includes a first inter-repeater bus and a second inter-repeater bus. A first repeater circuit is connected to the first inter-repeater bus and to the second inter-repeater bus. The first repeater circuit includes a 10 megabit repeater core, and one or more 100 megabit repeater cores. A selector selects which of the repeater cores is to be connected to the first inter-repeater bus. Additionally, provision is made to allow a 100 megabit repeater core to be connected to the second inter-repeater bus.

In the preferred embodiment, the multi-segment repeater includes additional repeater circuits. The multi-segment repeater also includes an inter-repeater bus "in" connector and an inter-repeater bus "out" connector. The inter-repeater bus "in" connector and the inter-repeater bus "out" connector allow the multi-segment repeater to be connected to other like repeater products.

Also in the preferred embodiment of the present invention, the first repeater circuit includes various ports. For example, a first auto-negotiation module is connected to a first port. The first auto-negotiation module detects a data transfer speed for a first device connected to the first port. The auto-negotiating module connects the first port to 100 megabit repeater core when the first device supports 100 megabit operation. The auto-negotiating module, or an added switch depending upon the embodiment, connects the first port to the 10 megabit repeater core when the first device supports 10 megabit operation and does not support 100 megabit operation. Additional ports of the repeater circuit are similarly implemented. In the preferred embodiment, the auto-negotiation function, as defined in the IEEE 802.3u section 28, will yield the greatest common data rate supported by the attached device and associated port. When the auto-negotiation for a port yields a data rate of 10 megabits, the port is connected to a 10 megabit repeater core. When the auto-negotiation for a port yields a data rate of 100 megabits, the port is connected to a 100 megabit repeater core.

A control register, accessible by an external processor, holds a configuration value which configures the selector. The configuration value also can be used to enable and disable connection between a 100 megabit repeater core and the second inter-repeater bus, and/or can be used to select between 100 megabit repeater cores.

This invention extends the concept of 10 megabit and 100 megabit inter-repeater buses and combines it with the concept of multi-segments or multiple inter-repeater buses for bandwidth improvement. The present invention allows the 10 megabit inter-repeater bus of a 10/100 megabit multi-segment repeater to function at either 10 megabit or 100 megabit. This change allows for user evolution and investment protection with the same product.

For example, users may initially have mixed environments of 10 megabit and 100 megabit equipment which are interconnected via the multi-segment repeater. In this case, the 10/100 inter-repeater bus functions as a 10 megabit only inter-repeater bus. As older 10 megabit network devices are upgraded with newer, high-speed 100 megabit devices there may come a point at which no ports of a 10/100 megabit multi-segment repeater are using the 10 megabit capabilities of the multi-segment repeater. That is, all ports reside on the 100 megabit inter-repeater bus. Hence, the 10 inter-repeater bus is unused and idle. However, when there is no longer a need for a 10 megabit inter-repeater bus, the present invention allows the 10 megabit inter-repeater bus to be reconfigured to function as a second 100 megabit inter-repeater bus. This allows the bandwidth demand to be divided between two internal 100 megabit inter-repeater buses, thus increasing the available bandwidth on any one inter-repeater bus.

DESCRIPTION OF THE PREFERRED EMBODIMENT

Figure 1:
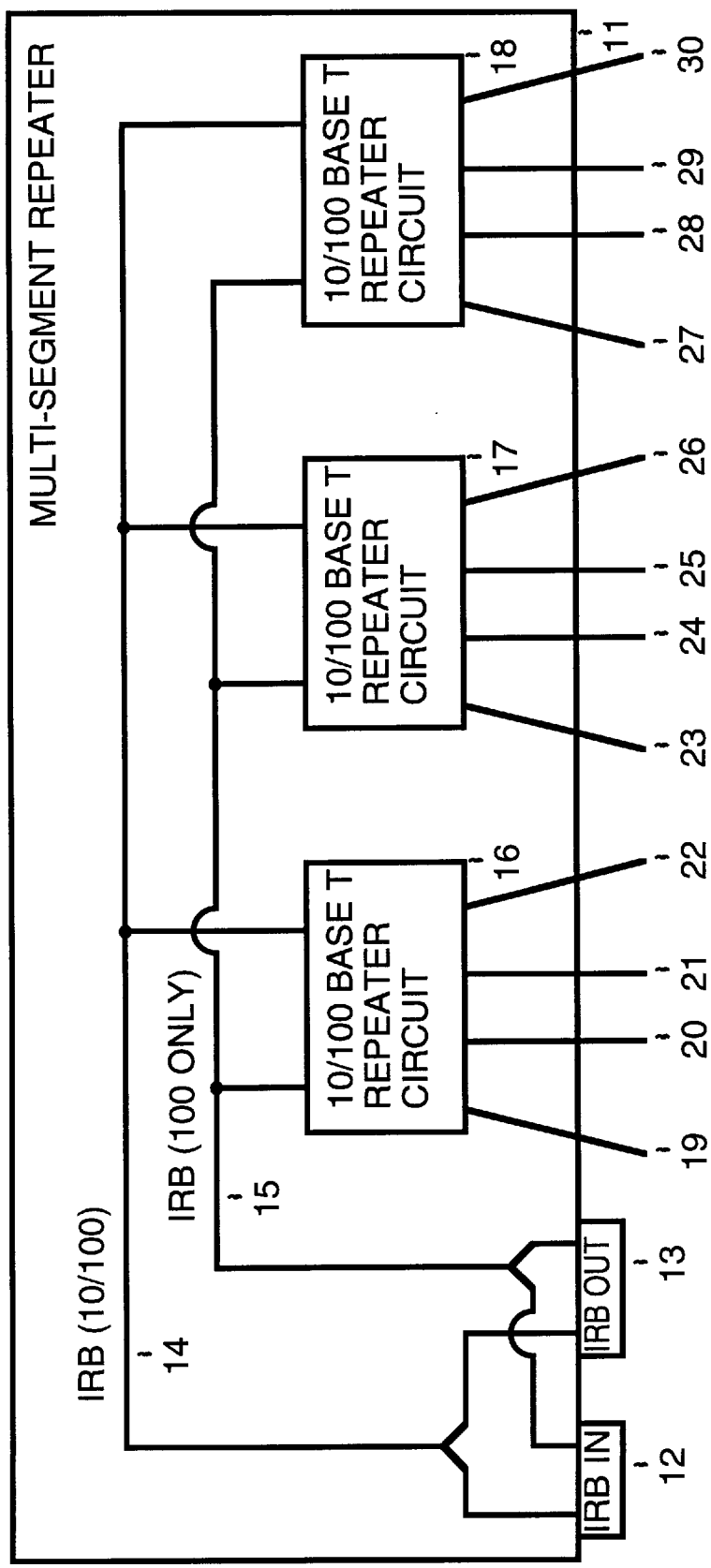
FIG. 1 is a block diagram of a multi-segment repeater, in accordance with the preferred embodiment of the present invention.

FIG. 1 shows a multi-segment repeater 11. Multi-segment repeater 11 includes a 10/100BaseT repeater circuit 16, a 10/100BaseT repeater circuit 17 and a 10/100BaseT repeater circuit 18. Multi-segment repeater 11 may include additional 10/100BaseT repeater circuits. A port 19, a port 20, a port 21 and a port 22 of repeater 11 are connected to 10/100BaseT repeater circuit 16. Each of ports 19 through 22 may function as a 10BaseT port or a 100BaseT port.

A port 23, a port 24, a port 25 and a port 26 of repeater 11 are connected to 10/100BaseT repeater circuit 17. Each of ports 23 through 26 may function as a 10BaseT port or a 100BaseT port. A port 27, a port 28, a port 29 and a port 30 of repeater 11 are connected to 10/100BaseT repeater circuit 18. Each of ports 27 through 30 may function as a 10BaseT port or a 100BaseT port.

Each port of 10/100BaseT repeater circuit 16, 10/100BaseT repeater circuit 17 and 10/100BaseT repeater circuit 18 are connected to an inter-repeater bus (IRB) 14 and an inter-repeater bus 15. Inter-repeater bus 15 functions as a 100 megabit inter-repeater bus. Inter-repeater bus 14 functions either as a 10 megabit inter-repeater bus or a 100 megabit inter-repeater bus. In various embodiments of the present invention, multi-segment repeater 11 may include additional inter-repeater buses.

When inter-repeater bus 14 functions as a 100 megabit inter-repeater bus, the number of data signals present is typically four, when 5 bit-to-4 bit decoding has occurred, otherwise 5 data signals exist. When inter-repeater bus 14 functions as a 10 megabit inter-repeater bus, a single data signal can be used when the data is transferred across inter-repeater bus 14 at 10 MHz. Alternatively, when inter-repeater bus 14 functions as a 10 megabit inter-repeater bus, data can be transferred across the inter-repeater bus 14 at 2.5 MHz when four data bits are used. This is especially advantageous for the implementation of a 10/100 inter-repeater bus, since the interface to inter-repeater bus 14 is very similar whether inter-repeater bus 14 is functioning as a 10 megabit inter-repeater bus or is functioning as a 100 megabit inter-repeater bus. The major difference is the clocking speed (2.5 MHz for 10BaseT and 25 MHz for 100BaseT).

An inter-repeater bus "in" connector 12 and an inter-repeater bus "out" connector 13 allow multi-segment repeater 11 to be interconnected with other like repeater products.

Figure 2:
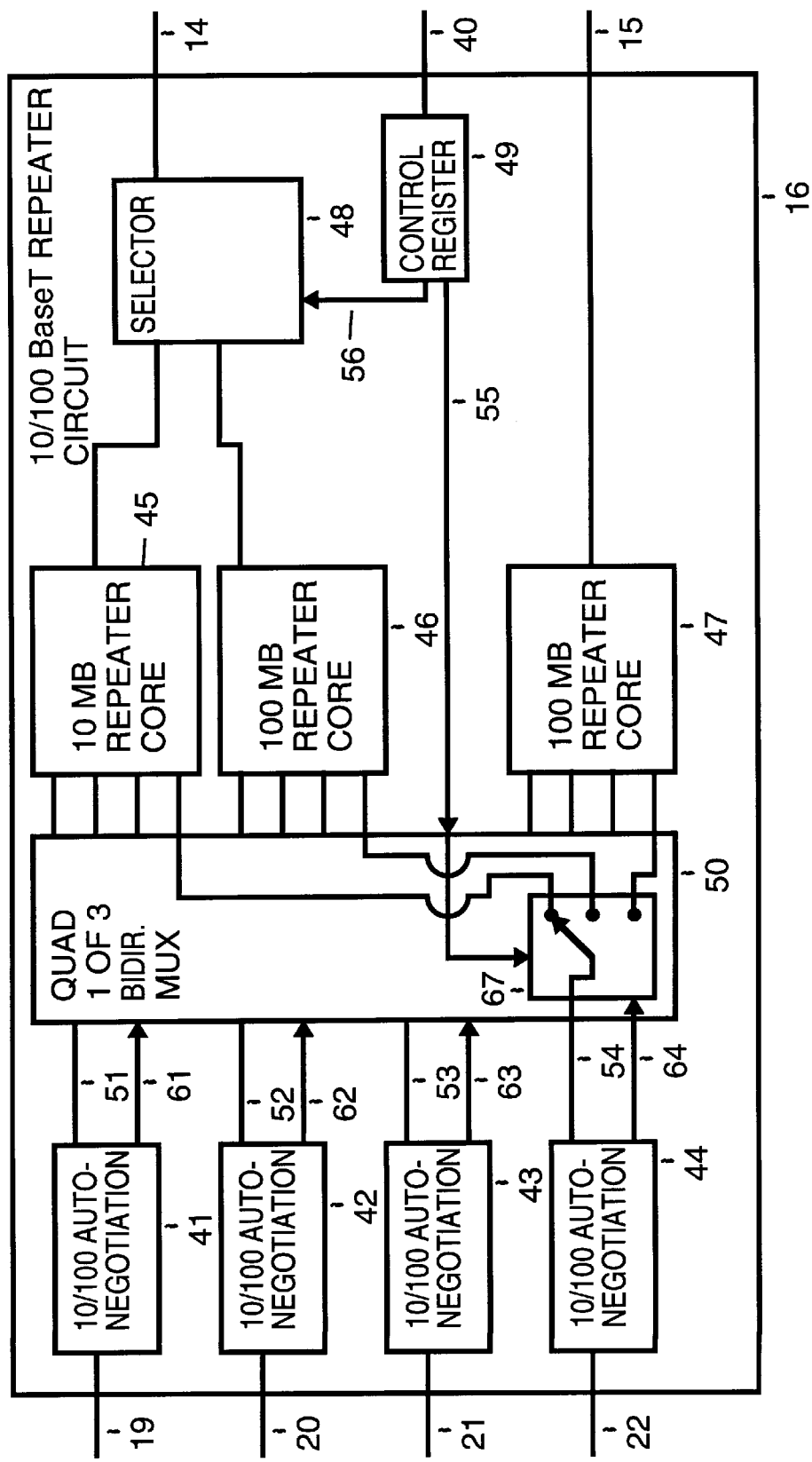
FIG. 2 is a block diagram of a 10/100BaseT repeater circuit, in accordance with a preferred embodiment of the present invention.

FIG. 2 is a block diagram of 10/100BaseT repeater circuit 16. 10/100BaseT repeater circuit 17 and 10/100BaseT repeater circuit 18 are constructed similarly to 10/100BaseT repeater circuit 16.

10/100BaseT repeater circuit 16 includes a 10 megabit repeater core 45, a 100 megabit repeater core 46 and a 100 megabit repeater core 47. For example, 10 megabit repeater core 45 is an IEEE 802.3 CSMA/CD 10 megabit repeater core (function). 100 megabit repeater core 46 and 100 megabit repeater core 47 are each an IEEE 802.3u CSMA/CD 100 megabit repeater core (function).

A selector 48 connects to inter-repeater bus 14 one of 10 MB repeater core 45, or 100 megabit repeater core 46. A one-bit configuration value in control register 49, delivered to selector 48 through a one-bit bus 56, controls which of 10 MB repeater core 45 or 100 megabit repeater core 46 is connected to inter-repeater bus 14.

100 megabit repeater core 47 is connected to inter-repeater bus 15. In an alternative embodiment, if desired, a one-bit configuration value in control register 49 can be added to control an enable gate which controls the connection between 100 megabit repeater core 47 and inter-repeater bus 15.

The one-bit configuration value in control register 49 may be accessed and updated by an external processor through a processor interface 40 or driven directly via a dedicated control pin.

Table 1 below shows inter-repeater bus assignments for each value of the one-bit configuration value in control register 49.

TABLE 1

| Configuration Value | Inter-repeater bus 14 |
|---|---|
| 0 | 10 megabit repeater core 45 |
| 1 | 100 megabit repeater core 46 |

A 10/100 auto-negotiation block 41 is used to determine whether a device on port 19 supports 10 megabit operation or supports 100 megabit operation. 10/100 auto-negotiation block 41 forwards, via a bus 51, the signals on port 19 through to a quad 1 of 3 bi-directional multiplexed 50. 10/100 auto-negotiation block 41 signals quad 1 of 3 bi-directional multiplexer 50 whether the device on port 19 supports 10 megabit operation or supports 100 megabit operation by placing an appropriate value on a line 61. The auto-negotiation function, as defined in IEEE 802.3u section 28, will yield the greatest common data rate supported by the attached device and port 19.

A 10/100 auto-negotiation block 42 is used to determine whether a device on port 20 supports 10 megabit operation or supports 100 megabit operation. 10/100 auto-negotiation block 42 forwards, via a bus 52, the signals on port 20 through to quad 1 of 3 bi-directional multiplexer 50. 10/100 auto-negotiation block 42 signals quad 1 of 3 bi-directional multiplexer 50 whether the device on port 20 supports 10 megabit operation or supports 100 megabit operation by placing an appropriate value on a line 62. The auto-negotiation function, as defined in IEEE 802.3u section 28, will yield the greatest common data rate supported by the attached device and port 20.

A 10/100 auto-negotiation block 43 is used to determine whether a device on port 21 supports 10 megabit operation or supports 100 megabit operation. 10/100 auto-negotiation block 43 forwards, via a bus 53, the signals on port 21 through to quad 1 of 3 bi-directional multiplexer 50. 10/100auto-negotiation block 43 signals quad 1 of 3 bi-directional multiplexer 50 whether the device on port 21 supports 10 megabit operation or supports 100 megabit operation by placing an appropriate value on a line 63. The auto-negotiation function, as defined in IEEE 802.3u section 28, will yield the greatest common data rate supported by the attached device and port 21.

A 10/100 auto-negotiation block 44 is used to determine whether a device on port 22 supports 10 megabit operation or supports 100 megabit operation. 10/100 auto-negotiation block 44 forwards, via a bus 54, the signals on port 22 through to quad 1 of 3 bi-directional multiplexer 50. 10/100 auto-negotiation block 44 signals quad 1 of 3 bi-directional multiplexer 50 whether the device on port 22 supports 10 megabit operation or supports 100 megabit operation by placing an appropriate value on a line 64. The auto-negotiation function, as defined in IEEE 802.3u section 28, will yield the greatest common data rate supported by the attached device and port 22.

Control register 49 also stores a four-bit configuration value which indicates, for each of ports 19–22, which 100 megabit repeater will receive the signals from the port when the device on the port supports 100 megabit operation. The four-bit configuration value is forwarded to quad 1 of 3 bi-directional multiplexer 50 via a four-bit bus 55. Quad 1 of 3 bi-directional multiplexer 50 uses one bit of the four-bit configuration value to select a repeater for each port. The four-bit configuration value in control register 49 may be accessed and updated by an external processor through a processor interface 40 or driven directly via a dedicated control pin.

For example, a switch 67 within quad 1 of 3 bi-directional multiplexer 50 receives, from 10/100 auto-negotiation block 44, data signals on bus 54 and a control signal on line 64. The control signal on line 64 indicates whether the device on port 23 is a 10 megabyte device or is a 100 megabyte device. On the basis of the value of the control signal on line 64 and the dedicated bit of the four-bit configuration value on four-bit bus 55, switch 67 connects the data signals on bus 54 to either 10 megabit repeater core 45, 100 megabit repeater core 46 or 100 megabit repeater core 47.

For example, Table 2 below shows inter-repeater bus assignments for values of control signal on line 64 and the bit of the four-bit configuration value on four-bit bus 55 dedicated to switch 67:

TABLE 2

| Control bit from line 64 | Bit from line 55 | Selected Repeater |
| --- | --- | --- |
| 0 | 0 | 100 megabit repeater core 47 |
| 0 | 1 | 100 megabit repeater core 46 |
| 1 | Don't Care | 10 megabit repeater core 45 |

Quad 1 of 3 bi-directional multiplexer additionally includes a switch for each of ports 19, 20, and 21. Each switch operates identical to switch 67. For example, the switch for port 19 utilizes the control bit on line 61 and a dedicated bit of the configuration value on line 55 to select one of 10 megabit repeater core 45, 100 megabit repeater core 46 or 100 megabit repeater core 47 to connect to the data signals on bus 51. The switch for port 20 utilizes the control bit on line 62 and a dedicated bit of the configuration value on line 55 to select one of 10 megabit repeater core 45, 100 megabit repeater core 46 or 100 megabit repeater core 47 to connect to the data signals on bus 52. The switch for port 21 utilizes the control bit on line 63 and a dedicated bit of the configuration value on line 55 to select one of 10 MB repeater core 45, 100 megabit repeater core 46 or 100 megabit repeater core 47 to connect to the data signals on bus 53.

Figure 3:
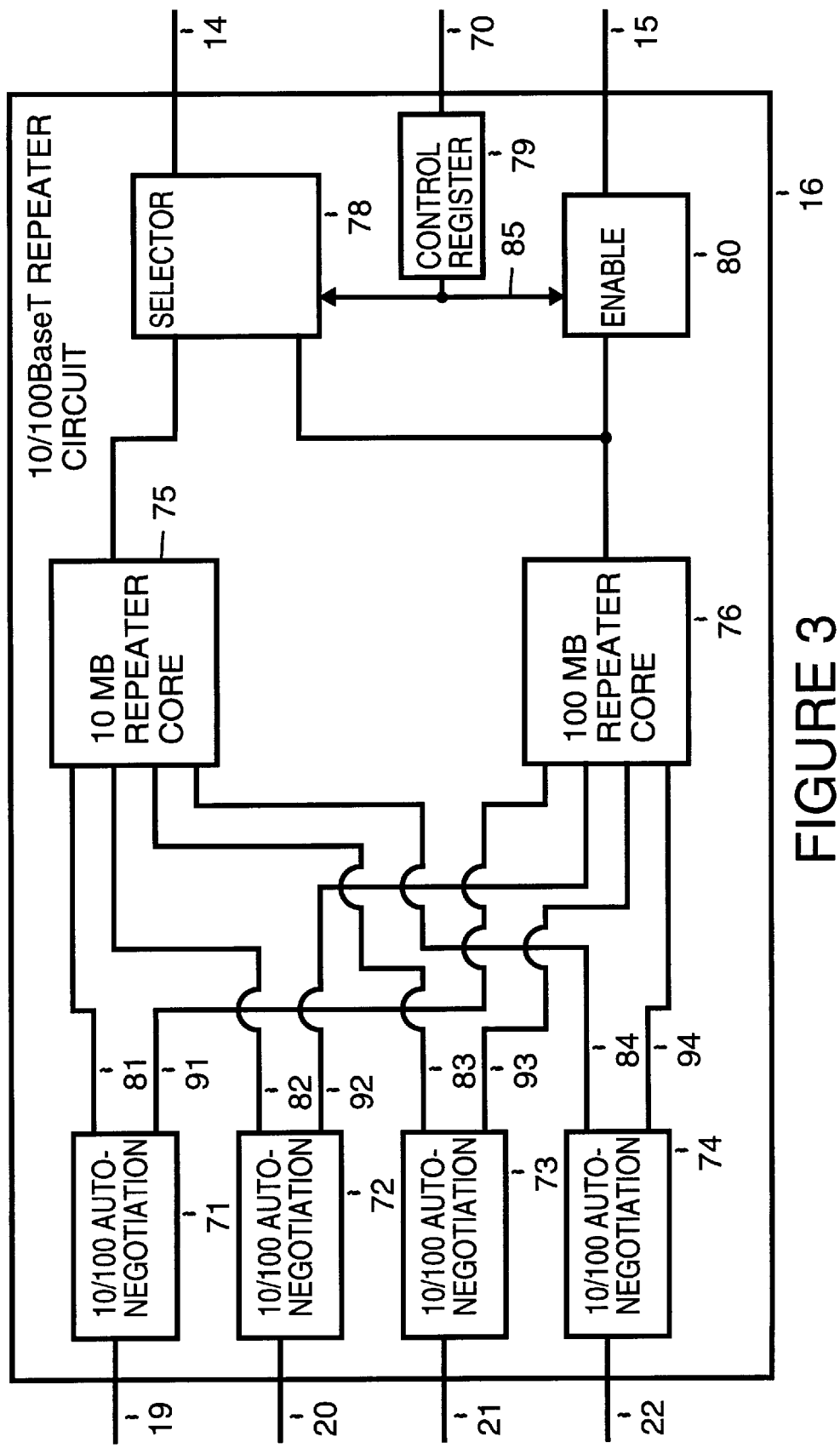
FIG. 3 is a block diagram of a 10/100BaseT repeater circuit, in accordance with an alternative preferred embodiment of the present invention.

FIG. 3 is a block diagram of an alternative embodiment of 10/100BaseT repeater circuit 16. 10/100BaseT repeater circuit 17 and 10/100BaseT repeater circuit 18 may also be constructed similarly to this alternative embodiment of 10/100BaseT repeater circuit 16.

In accordance with the alternative embodiment, 10/100BaseT repeater circuit 16 includes a 10 megabit repeater core 75, and a 100 megabit repeater core 76. For example, 10 megabit repeater core 75 is an IEEE 802.3 CSMA/CD 10 megabit repeater. 100 megabit repeater core 76 is an IEEE 802.3u CSMA/CD 100 megabit repeater.

A selector 78 connects to inter-repeater bus 14 one of 10 MB repeater core 75, or 100 megabit repeater core 76. A one-bit configuration value in control register 79, delivered to selector 78 through a one-bit bus 85, controls which of 10 MB repeater core 75 or 100 megabit repeater core 76 is connected to inter-repeater bus 14.

100 megabit repeater core 76 is also connected, through an enable gate 80, to inter-repeater bus 15. The one-bit configuration value in control register 79 is used to control enable 80 gate thereby controlling the connection between 100 megabit repeater 76 and inter-repeater bus 15.

The one-bit configuration value in control register 79 may be accessed and updated by an external processor through a processor interface 70 or driven directly via a dedicated control pin.

Table 3 below shows inter-repeater bus assignments for each value of the one-bit configuration value in control register 79.

TABLE 3

| Configuration Value | Inter-repeater bus 14 | Inter-repeater bus 15 |
| --- | --- | --- |
| 0 | 10 megabit repeater core 75 | 100 megabit repeater core 76 |
| 1 | 100 megabit repeater core 76 | Connection Disabled |

A 10/100 auto-negotiation block 71 is used to determine whether a device on port 19 supports 10 megabit operation or supports 100 megabit operation. 10/100 auto-negotiation block 71 connects port 19, via a bus 81, through to 10 megabit repeater core 75 when the device on port 19 supports 10 megabit operation but does not support 100 megabit operation. 10/100 auto-negotiation block 71 connects port 19, via a bus 91, through to 100 megabit repeater core 76 when the device on port 19 supports 100 megabit operation.

A 10/100 auto-negotiation block 72 is used to determine whether a device on port 20 supports 10 megabit operation or supports 100 megabit operation. 10/100 auto-negotiation block 72 connects port 20, via a bus 82, through to 10 megabit repeater core 75 when the device on port 20 supports 10 megabit operation but does not support 100 megabit operation. 10/100 auto-negotiation block 72 connects port 20, via a bus 92, through to 100 megabit repeater core 76 when the device on port 20 supports 100 megabit operation.

A 10/100 auto-negotiation block 73 is used to determine whether a device on port 21 supports 10 megabit operation or supports 100 megabit operation. 10/100 auto-negotiation block 73 connects port 21, via a bus 83, through to 10 megabit repeater core 75 when the device on port 21 supports 10 megabit operation but does not support 100 megabit operation. 10/100 auto-negotiation block 73 connects port 21, via a bus 93, through to 100 megabit repeater core 76 when the device on port 21 supports 100 megabit operation.

A 10/100 auto-negotiation block 74 is used to determine whether a device on port 22 supports 10 megabit operation or supports 100 megabit operation. 10/100 auto-negotiation block 74 connects port 22, via a bus 84, through to 10 megabit repeater core 75 when the device on port 22 supports 10 megabit operation but does not support 100 megabit operation. 10/100 auto-negotiation block 74 connects port 22, via a bus 94, through to 100 megabit repeater core 76 when the device on port 22 supports 100 megabit operation.

In the embodiment shown in FIG. 3, 100 megabit repeater core 76 can be connected either to inter-repeater bus 14 or inter-repeater bus 15. For this embodiment, only a single 100 megabit repeater is required, which results in a low gate count and low cost. This is important in the case, for example, where there are four, 4-port repeater integrated circuits in a repeater product. This embodiment allows any group of four ports (attached to the same repeater integrated circuit) to be logically connected to one of two inter-repeater buses. This allows for creation of a multi-segment 100BaseT arrangement.

While FIG. 3 represents a less expensive and lest complex implementation, the embodiment illustrated in FIG. 2 is more flexible. In the embodiment illustrated in FIG. 2, each of ports 19, 20, 21 and 22 of 10/100BaseT repeater circuit 16 can be connected to either of 100 megabit repeater core 46 or 100 megabit repeater core 47. In either of the embodiments shown in FIG. 2 and FIG. 3, when 10/100 inter-repeater bus 14 operates at 100 megabits, 10 megabit operation is lost.

The foregoing discussion discloses and describes merely exemplary methods and embodiments of the present invention. As will be understood by those familiar with the art, the invention may be embodied in other specific forms without departing from the spirit or essential characteristics thereof. For example, in the preferred embodiments, one inter-repeater bus was a 100 megabit and another was 10/100 megabit. In alternative embodiments of the present invention, one inter-repeater bus could be a 10 megabit and another could be 10/100 megabit. Or both inter-repeater buses could be 10/100 megabit. Alternatively, the inter-repeater buses could each operate at transfer rates of other than 10 or 100 megabits. Accordingly, the disclosure of the present invention is intended to be illustrative, but not limiting, of the scope of the invention, which is set forth in the following claims.

I claim:

1. A multi-segment repeater comprising:
   a first inter-repeater bus;
   a second inter-repeater bus; and,
   a first repeater circuit, coupled to the first inter-repeater bus and the second inter-repeater bus, comprising:
      a 10 megabit repeater core,
      a first 100 megabit repeater core,
      a second 100 megabit repeater core,
      a selector for selecting whether the 10 megabit repeater core is to be connected to the first inter-repeater bus and whether the first 100 megabit repeater core is to be connected to the first inter-repeater bus, and
      connection means for connecting the second 100 megabit repeater core to the second inter-repeater bus, wherein the 10 megabit repeater core is not connectable to the second inter-repeater bus.

2. A multi-segment repeater as in claim 1 additionally comprising:
   a second repeater circuit, coupled to the first inter-repeater bus and the second inter-repeater bus.

3. A multi-segment repeater as in claim 2 additionally comprising:
   a third repeater circuit, coupled to the first inter-repeater bus and the second inter-repeater bus.

4. A multi-segment repeater as in claim 1 wherein the first repeater circuit additionally comprises:
   a first port;
   a first auto-negotiation module, coupled to the first port, the first auto-negotiation module detecting a data transfer speed for a first device connected to the first port; and,
   selection means, coupled to the auto-negotiation module, the selection means connecting the first port through to the 10 megabit repeater core when the first device supports 10 megabit operation and does not support 100 megabit operation, and the selection means connecting the first port through to one of the first 100 megabit repeater core and the second 100 megabit repeater core when the first device supports 100 megabit operation.

5. A multi-segment repeater as in claim 4 wherein the first repeater circuit additionally comprises:
   a second port; and,
   a second auto-negotiation module coupled to the second port, the second auto-negotiation module detecting a data transfer speed for a second device connected to the second port.

6. A multi-segment repeater as in claim 1 wherein the first repeater circuit additionally comprises:
   a control register, coupled to the selector and the connection means, the control register holding a configuration value which configures the selector and the selection means.

7. A multi-segment repeater comprising:
   a first inter-repeater bus;
   a second inter-repeater bus; and,
   a first repeater circuit, coupled to the first inter-repeater bus and the second inter-repeater bus, comprising:
      a 10 megabit repeater core,
      a 100 megabit repeater core,
      a selector for selecting whether the 10 megabit repeater core is to be connected to the first inter-repeater bus and whether the 100 megabit repeater core is to be connected to the first inter-repeater bus; and
      connection means for connecting the 100 megabit repeater core to the second inter-repeater bus, wherein the 10 megabit repeater core is not connectable to the second inter-repeater bus.

8. A multi-segment repeater as in claim 7 wherein the first repeater circuit additionally comprises:
   a first port; and,
   a first auto-negotiation module coupled to the first port, the first auto-negotiation module detecting a data transfer speed for a first device connected to the first port, the auto-negotiating module connecting the first port to the 10 megabit repeater core when the first device supports 10 megabit operation and does not support 100 megabit operation, and the auto-negotiating module connecting the first port to the 100 megabit repeater core when the first device supports 100 megabit operation.

9. A multi-segment repeater as in claim 8 wherein the first repeater circuit additionally comprises:
   a second port; and,
   a second auto-negotiation module coupled to the second port, the second auto-negotiation module detecting a data transfer speed for a second device connected to the second port, the auto-negotiating module connecting the second port to the 10 megabit repeater core when the second device supports 10 megabit operation and does not support 100 megabit operation, and the auto-negotiating module connecting the second port to one of the second 100 megabit repeater core and the second 100 megabit repeater core when the second device supports 100 megabit operation.

10. A repeater circuit, for connection to a first inter-repeater bus and a second inter-repeater bus, the repeater circuit comprising:
   a first repeater core which operates at a first repeater frequency;
   a second repeater core which operates at a second repeater frequency;

a selector for selecting whether the first repeater core is to be connected to the first inter-repeater bus and whether the second repeater core is to be connected to the first inter-repeater bus;

a third repeater core which operates at the second repeater frequency; and, connection means for directly connecting the third repeater core to the second inter-repeater bus, the first repeater core and the second repeater core not being connectable to the second inter-repeater bus.

11. A repeater circuit as in claim 10 additionally comprising:

a first port;

a first auto-negotiation module, coupled to the first port, the first auto-negotiation module detecting a data transfer speed for a first device connected to the first port; and, selection means, coupled to the auto-negotiation module, the selection means connecting the first port through to the first repeater core when the first device supports 10 megabit operation and does not support 100 megabit operation, and the selection means connecting the first port through to the second repeater core when the first device supports 100 megabit operation.

12. A repeater circuit as in claim 10 wherein the repeater circuit additionally comprises:

connection means for connecting the second repeater core to the second inter-repeater bus.

13. A repeater circuit as in claim 12 additionally comprising:

a first port; and, a first auto-negotiation module coupled to the first port, the first auto-negotiation module detecting a data transfer speed for a first device connected to the first port, the auto-negotiating module connecting the first port to the first repeater core when the first device supports 10 megabit operation and does not support 100 megabit operation, and the auto-negotiating module connecting the first port to the second repeater core when the first device supports 100 megabit operation.

14. A repeater circuit as in claim 13 wherein the connection means is an enable blocks which enables and disables connection of the third repeater core to the second inter-repeater bus.

15. A repeater circuit as in claim 10, additionally comprising:

a control register, coupled to the selector and the connection means, the control register holding a configuration value which configures the selector.

16. A method for connecting ports of a repeater circuit to a first inter-repeater bus and to a second inter-repeater bus, the method comprising the steps of:

(a) including within the repeater circuit a first repeater core which operates at a first repeater frequency, a second repeater core which operates at a second repeater frequency a third repeater core which operates at the second repeater frequency;

(b) selecting whether the first repeater core is to be connected to the first inter-repeater bus and whether the second repeater core is to be connected to the first inter-repeater bus; and, (c) connecting a third repeater core to directly to the second inter-repeater bus wherein the first repeater core and the second repeater core are not connectable to the second inter-repeater bus.

17. A method as in claim 16 additionally comprising the following steps:

(d) detecting a data transfer speed for a first device connected to a first port;

(e) connecting the first port to the first repeater core when the first device supports 10 megabit operation and does not support 100 megabit operation; and, (f) connecting the first port to the second repeater core when the first device supports 100 megabit operation.

* * * * *